United States Patent
Gugumus

(10) Patent No.: US 6,916,867 B2
(45) Date of Patent: Jul. 12, 2005

(54) SYNERGISTIC MIXTURES OF UV-ABSORBERS IN POLYOLEFINS

(75) Inventor: François Gugumus, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 339 days.

(21) Appl. No.: 09/823,041

(22) Filed: Mar. 30, 2001

(65) Prior Publication Data

US 2001/0039304 A1 Nov. 8, 2001

(30) Foreign Application Priority Data

Apr. 4, 2000 (EP) .............................................. 00810290

(51) Int. Cl.⁷ ...................... C08K 5/3475; C08K 5/3477
(52) U.S. Cl. ............................. 524/89; 524/91; 524/94; 524/99; 524/100; 524/242
(58) Field of Search .............................. 524/89, 91, 94, 524/99, 100, 242

(56) References Cited

U.S. PATENT DOCUMENTS

| | | | |
|---|---|---|---|
| 3,529,982 A | 9/1970 | Luethi et al. | 106/178 |
| 4,228,067 A | 10/1980 | Lachmann et al. | 260/45.85 |
| 4,524,165 A * | 6/1985 | Musser et al. | |
| 4,619,956 A | 10/1986 | Susi | 524/87 |
| 4,891,396 A | 1/1990 | Avar et al. | 524/91 |
| 4,938,955 A * | 7/1990 | Niira et al. | 424/78.1 |
| 5,106,891 A | 4/1992 | Valet | 524/91 |
| 5,498,345 A | 3/1996 | Jöllenbeck et al. | 252/589 |
| 5,736,597 A | 4/1998 | Birbaum et al. | 524/100 |
| 6,191,199 B1 * | 2/2001 | Renz et al. | |

FOREIGN PATENT DOCUMENTS

| | | |
|---|---|---|
| DE | 2502015 | 12/1975 |
| EP | 0048594 | 3/1982 |
| EP | 0 095 078 | 5/1983 |
| EP | 0424153 | 4/1991 |
| EP | 0 698 637 | 2/1996 |
| GB | 1 336 391 | 11/1973 |
| GB | 2209164 | 5/1989 |
| JP | 9-193322 | 7/1997 |
| WO | 97/39052 | 10/1997 |
| WO | 98/27168 | 6/1998 |

OTHER PUBLICATIONS

Derwent Abstr. 1975–81836W [50] for DE 2502015 (1975).

* cited by examiner

Primary Examiner—Tae H. Yoon
(74) Attorney, Agent, or Firm—Tyler A. Stevenson

(57) ABSTRACT

The present invention relates to polyolefin compositions which comprise as UV absorber a synergistic mixture of a) at least one hydroxybenzophenone and at least one 2-hydroxyphenylbenzotriazole with the proviso that the polyolefin is a high density polyethylene of the "Phillips" type or a polyethylene of the metallocene type;

b) at least one hydroxybenzophenone and at least one 2-hydroxyphenyltriazine, with the proviso that if the polyolefin is polypropylene, no polyvinylpyridin is present c) at least one hydroxybenzophenone and at least one oxanilide;

d) at least one 2-hydroxyphenylbenzotriazole and at least one oxanilide;

e) at least one 2-hydroxyphenyltriazine and at least one oxanilide;

f) at least one hydroxybenzophenone, at least one 2-hydroxyphenylbenzotriazole and at least one oxanilide;

g) at least one hydroxybenzophenone, at least one oxanilide and at least one 2-hydroxyphenyltriazine; or h) at least one 2-hydroxyphenylbenzotriazole, at least one oxanilide and at least one 2-hydroxy phenyltriazine.

4 Claims, No Drawings

SYNERGISTIC MIXTURES OF UV-ABSORBERS IN POLYOLEFINS

The present invention relates to novel polyolefin compositions which contain mixtures of different UV absorbers.

The effects of atmospheric oxygen, moisture and, in particular, UV light result in degradation of the polymer material. This manifests itself, for example, in the loss of mechanical strength, changes in shade and finally total breakdown of the polymer article. As is known, it is possible to retard such degradation processes in polyolefins by the use of suitable stabilizers, and there are numerous prior art documents in this field.

In the coatings field, EP-A-0453 396 discloses that mixtures of hydroxyphenyl-benzotriazole with hydroxybenzophenon or with hydroxyphenyl-s-triazine UV-absorbers lead to synergistic mixtures which prevent the coatings life time unexpectedly long from degradation.

Although there are prior art documents, such as FR 2619 814, which generically disclose the combined use of oxalamide UV absorbers, particularly in coatings, with benzophenone or benzotriazole UV absorbers, there is however no suggestion in the prior art for the instant combinations in polyolefins.

It has now been found that certain combinations of UV absorbers of different chemical structures are capable of substantially preventing the degradation of polyolefins.

The combinations of the present invention provide an unexpected synergistic stabilization effect for polyolefin articles. The effect is not predictable from the absorption spectra and has not been observed with other UV absorber combinations in polyolefins.

One subject of the present invention is a polyolefin composition which comprises as UV absorber a mixture of a) at least one hydroxybenzophenone and at least one 2-hydroxyphenylbenzotriazole with the proviso that the polyolefin is a high density polyethylene of the "Phillips" type or a polyethylene of the metallocene type;
b) at least one hydroxybenzophenone and at least one 2-hydroxyphenyltriazine, with the proviso that if the polyolefin is polypropylene, no polyvinylpyridin is present
c) at least one hydroxybenzophenone and at least one oxanilide;
d) at least one 2-hydroxyphenylbenzotriazole and at least one oxanilide;
e) at least one 2-hydroxyphenyltriazine and at least one oxanilide;
f) at least one hydroxybenzophenone, at least one 2-hydroxyphenylbenzotriazole and at least one oxanilide;
g) at least one hydroxybenzophenone, at least one oxanilide and at least one 2-hydroxyphenyltriazine; or
h) at least one 2-hydroxyphenylbenzotriazole, at least one oxanilide and at least one 2-hydroxyphenyltriazine.

Suitable polyolefins are mentioned below.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene(HDPE-UHMW), medium density polyethylene (MDPE), low density polyethylene (LDPE), linear low density polyethylene (LLDPE), (VLDPE) and (ULDPE), metallocene polyethylen (m-PE) in particular m-LLDPE and metallocene poylpropylene (m-PP).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE), metallocene types with conventional types (for example m-PE/PE-LLD, m-PE/PE-LD, m-PP/conventional PP).

Preferably the polyolefin is polyethylene or polypropylene.

Preferred UV-absorber mixtures are:

a) at least one hydroxybenzophenone and at least one 2-hydroxyphenylbenzotriazole with the proviso that the polyolefin is a high density polyethylene of the "Phillips" type or a polyethylene of the metallocene type;
b) at least one hydroxybenzophenone and at least one 2-hydroxyphenyltriazine, with the proviso that if the polyolefin is polypropylene, no polyvinylpyridin is present and;
e) at least one 2-hydroxyphenyltriazine and at least one oxanilide.

Preferred polyolefin compositions are wherein the hydroxybenzophenone is of formula I

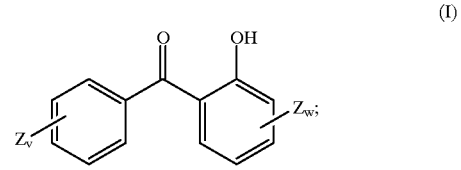

the 2-hydroxyphenylbenzotriazole is of formula IIa, IIb or IIc

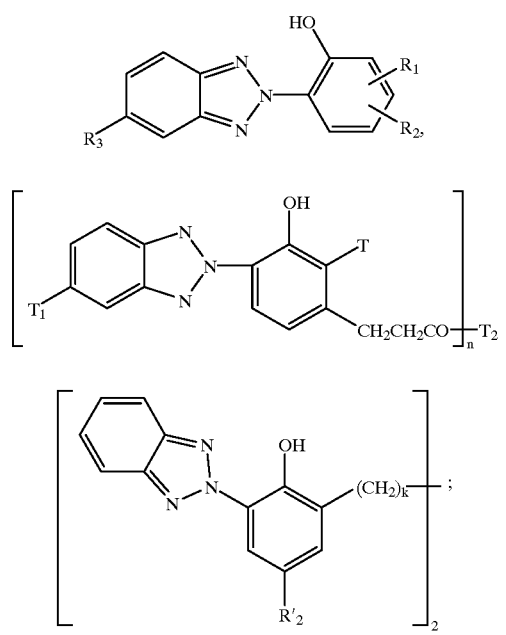

the 2-hydroxyphenyltriazine is of formula III

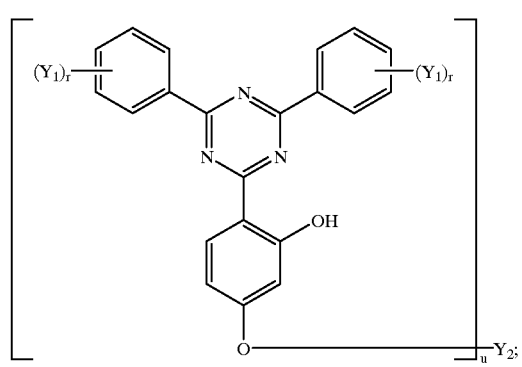

and the oxanilide is of formula (IV)

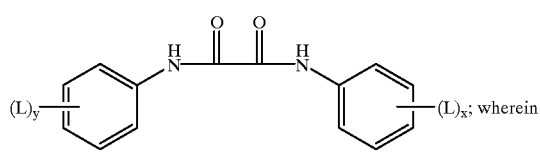

in the compounds of the formula (I) v is an integer from 1 to 3 and w is 1 or 2 and the substituents Z independently of one another are hydrogen, halogen, hydroxyl or alkoxy having 1 to 12 carbon atoms;

in the compounds of the formula (IIa), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

in which $R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula —$COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or

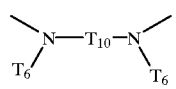

and, if n is 2, $T_2$ is a radical of the formula

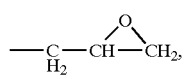

or —O—$T_9$—O— in which $T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$— and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$—$T_7$ or —$\underset{H_2}{C}$—CH—$CH_2$,  (epoxide)

$T_4$ and $T_5$ independently of one another are hydrogen, alkyl having 1 to 18 carbon atoms, alkyl which has 3 to 18 carbon atoms and is interrupted once or several times by —O— or —$NT_6$—, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylalkyl having 1 to 4 carbon atoms in the alkyl moiety, or —CH$_2$OT$_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, $T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —CH$_2$CH(OH)CH$_2$OT$_{11}$OCH$_2$CH(OH)CH$_2$— or —CH$_2$—C(CH$_2$OH)$_2$—CH$_2$—, $T_{10}$ is alkylene which has 2 to 20 carbon atoms and can be interrupted once or several times by —O—, or cyclohexylene, $T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;

in the compounds of formula (IIc)
R'$_2$ is C$_1$-C$_{12}$alkyl and k is a number from 1 to 4;
in the compounds of the formula (III)
u is 1 or 2 and r is an integer from 1 to 3, the substituents
$Y_1$ independently of one another are hydrogen, hydroxyl, halogenomethyl, alkyl having 1 to 12 carbon atoms, alkoxy having 1 to 18 carbon atoms, or halogen,
if u is 1,
$Y_2$ is alkyl having 1 to 18 carbon atoms, phenoxy which is unsubstituted or substituted by hydroxyl, alkoxy having 1 to 18 carbon atoms, or halogen, or is substituted by alkyl or alkoxy having in each case 1 to 18 carbon atoms or halogen, alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NHCOY$_{11}$, —CN and/or —OCOY$_{11}$, alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or,
if u is 2,
$Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which
m is 1, 2 or 3, $Y_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, $Y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenylene having 1 to 11 carbon atoms in the alkyl moiety, and $Y_{18}$ is alkylene having 2 to 10 carbon atoms or alkylene which has 4 to 20 carbon atoms and is interrupted once or several times by oxygen;

in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

In the compounds of the formula (IIa) $R_1$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers. Furthermore, in addition to phenylalkyl having 1 to 4 carbon atoms in the alkyl moiety, for example benzyl, $R_1$ can also be cycloalkyl having 5 to 8 carbon atoms, for example cyclopentyl, cyclohexyl and cyclooctyl, or a radical of the formula

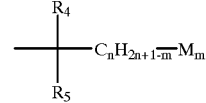

in which $R_4$ and $R_5$ independently of one another are alkyl having in each case 1 to 5 carbon atoms, in particular methyl, or $R_4$, together with the $C_nH_{2n+1-m}$ radical, forms a cycloalkyl radical having 5 to 12 carbon atoms, for example cyclohexyl, cyclooctyl and cyclodecyl. M is a radical of the formula —COOR$_6$ in which $R_6$ is not only hydrogen but also alkyl having 1 to 12 carbon atoms or alkoxyalkyl having 1 to 20 carbon atoms in each of the alkyl and alkoxy moieties. Suitable alkyl radicals $R_6$ are those enumerated for $R_1$. Examples of suitable alkoxyalkyl groups are —C$_2$H$_4$OC$_2$H$_5$, —C$_2$H$_4$OC$_8$H$_{17}$ and —C$_4$H$_8$OC$_4$H$_9$. As phenylalkyl having 1 to 4 carbon atoms, $R_6$ is, for example, benzyl, cumyl, α-methylbenzyl or phenylbutyl.

In addition to hydrogen and halogen, for example chlorine and bromine, $R_2$ can also be alkyl having 1 to 18 carbon atoms. Examples of such alkyl radicals are indicated in the definitions of $R_1$. $R_2$ can also be phenylalkyl having 1 to 4 carbon atoms in the alkyl moiety, for example benzyl, a-methylbenzyl and cumyl.

Halogen as a substituent means in all cases fluorine, chlorine, bromine or iodine, preferably chlorine or bromine and more preferably chlorine.

At least one of the radicals $R_1$ and $R_2$ must be other than hydrogen.

In addition to hydrogen or chlorine, $R_3$ is also alkyl or alkoxy having in each case 1 to 4 carbon atoms, for example methyl, butyl, methoxy and ethoxy, and also —$COOR_6$.

In the compounds of the formula (IIb) T is hydrogen or alkyl having 1 to 6 carbon atoms, such as methyl and butyl, $T_1$ is not only hydrogen or chlorine, but also alkyl or alkoxy having in each case 1 to 4 carbon atoms, for example methyl, methoxy and butoxy, and, if n is 1, $T_2$ is chlorine or a radical of the formula —$OT_3$ or —$NT_4T_5$. $T_3$ is here hydrogen or alkyl having 1 to 18 carbon atoms (cf. the definition of $R_1$). These alkyl radicals can be substituted by 1 to 3 hydroxyl groups or by a radical —$OCOT_6$. Furthermore, $T_3$ can be alkyl having 3 to 18 carbon atoms (cf. the definition of $R_1$) which is interrupted once or several times by —O— or —$NT_6$— and is unsubstituted or substituted by hydroxyl or —$OCOT_6$. Examples of $T_3$ as cycloalkyl are cyclopentyl, cyclohexyl or cyclooctyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —$CH_2CH(OH)$—$T_7$ or

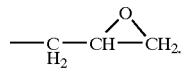

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —$NT_6$—. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

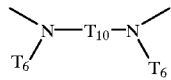

or —O—$T_9$—O—.

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —$CH_2OT_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —$CH_2CH(OH)CH_2OT_{11}OCH_2CH(OH)CH_2$— or —$CH_2$—$C(CH_2OH)_2$—$CH_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_1$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Examples of alkyl, alkoxy, phenylalkyl, alkylene, alkenylene, alkoxyalkyl and cycloalkyl radicals and also alkylthio, oxaalkylene or azoalkylene radicals in the compounds of the formulae (2), (3) and (4) can be deduced from the above statements.

The UV absorbers of the formulae (I), (IIa), (IIb), (IIc), (III) and (IV) are known per se and are described, together with their preparation, in, for example, EP-A-323 408, EP-A-57 160, U.S. Pat. No. 5,736,597 (EP-A-434 608), U.S. Pat. No. 4,619,956, DE-A 31 35 810 and GB-A 1 336 391. Preferred meanings of substituents and individual compounds can be deduced from the documents mentioned.

The compounds can be incorporated into polyolefins by customary methods which are known per se. The preparation may be carried out in a manner known per se by mixing the said components and, if desired, further additives with the polymer using devices known per se, such as calenders, mixers, kneaders, extruders and the like. The additives may be added individually or in admixture with one another. It is also possible to use so-called master batches.

In certain cases it can be advantageous to use even a mixture of compounds of all 4 classes of UV-absorbers (hydroxybenzophenone, 2-hydroxyphenyltriazine, oxanilide and 2-hydroxyphenylbenzotriazole).

The polyolefin composition obtainable according to the present invention can be made into the desired form in known manner. Such processes include, for example, grinding, calendering, extruding, injection-moulding, sintering, compression/sintering or spinning, also extrusion blow-moulding.

The amounts of UV absorber to be selected can depend on the nature of the polyolefin composition and the requirements for its stability. The individual UV absorber components can be added on their own or as a mixture to the appropriate polyolefin compositions. The customary other additives, such as processing stabilizers, antioxidants and other light stabilisers, can also be added to the polyolefin compositions, without thereby impairing the protective action of the UV absorber mixtures employed in accordance with the invention.

Preferred is a polyolefin composition wherein the substituent $R_1$ or $R_2$ in the compounds of the formula (IIa) is located in the ortho-position or para-position relative to the hydroxyl group.

Also preferred is a polyolefin composition, in which, in the compounds of the formula (IIa), $R_1$ is hydrogen or alkyl having 1 to 20 carbon atoms, $R_2$ is hydrogen, alkyl having 1 to 18 carbon atoms or phenylalkyl having 1 to 4 carbon atoms in the alkyl moiety and $R_3$ is hydrogen, chlorine or alkyl having 1 to 4 carbon atoms. Preference is given to compounds, in which $R_1$ is in the ortho-position relative to the hydroxyl group and is hydrogen or alkyl having 4 to 12 carbon atoms, $R_2$ is in the para-position relative to the hydroxyl group and is alkyl having 1 to 6 carbon atoms or cumyl and $R_3$ is hydrogen or chlorine. More preferably $R_1$ is alkyl having 8 to 12 carbon atoms, $R_2$ is alkyl having 4 to 6 carbon atoms and $R_3$ is hydrogen.

Other preferred polyolefin compositions are those, in which, in the compounds of the formula (IIb), T is alkyl having 1 to 6 carbon atoms, $T_1$ is hydrogen, chlorine or alkyl having 1 to 4 carbon atoms, n is 1 or 2 and, if n is 1, $T_2$ is one of the radicals of the formula —$OT_3$ or

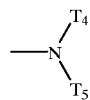

and, if n is 2, $T_2$ is a radical of the formula —O—$T_9$—O— or

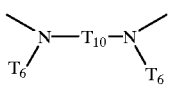

in which $T_3$ is hydrogen, alkyl having 1 to 18 carbon atoms or alkyl which has 3 to 18 carbon atoms and is interrupted once or several times by —O—, $T_4$ and $T_5$ independently of one another are hydrogen, alkyl having 1 to 18 carbon atoms, alkenyl having 3 to 8 carbon atoms or hydroxyalkyl having 2 to 4 carbon atoms, $T_6$ is hydrogen or alkyl having 1 to 6 carbon atoms, and $T_9$ and $T_{10}$ are alkylene having 2 to 8 carbon atoms, alkenylene having 4 to 8 carbon atoms or alkylene which has 2 to 18 carbon atoms and is interrupted once or several times by —O—.

More preferably, in which T is alkyl having 1 to 4 carbon atoms, $T_1$ is hydrogen or chlorine and $T_2$ is one of the radicals of the formula —$OT_3$ or —O—$T_9$—O— in which $T_3$ is hydrogen, alkyl having 1 to 12 carbon atoms or a radical of the formula —$(OC_2H_4)_{4-8}$——H and $T_9$ is alkylene having 2 to 8 carbon atoms.

Most preferably $T_2$ is a radical of the formula —$OT_3$ and $T_3$ is alkyl having 1 to 12 carbon atoms or a radical of the formula —$(OC_2H_4)_{4-8}$—H.

Further preferred polyolefin compositions are those, in which, in the compounds of the formula (III), the substituents $Y_1$ are hydrogen, alkyl having 1 to 12 carbon atoms or halogen, if u is 1, $Y_2$ is alkyl having 1 to 18 carbon atoms, alkyl which has 1 to 12 carbon atoms and is substituted by hydroxyl, alkoxy having 1 to 18 carbon atoms, —$COOY_8$, —$CONY_9Y_{10}$ and/or —$OCOY_{11}$, glycidyl or phenylalkyl having 1 to 4 carbon atoms in the alkyl moiety, or, if u is 2, $Y_2$ is alkylene having 2 to 16 carbon atoms, alkenylene having 4 to 12 carbon atoms, xylylene or alkylene which has 3 to 20 carbon atoms, is interrupted by one or more —O— atoms and/or is substituted by hydroxyl, the substituents $Y_8$ to $Y_{11}$ being as defined above.

Preferably $Y_1$ are hydrogen, alkyl having 1 to 4 carbon atoms or chlorine, if u is 1, $Y_2$ is alkyl which has 1 to 4 carbon atoms and is unsubstituted or substituted by hydroxyl, alkoxy having 1 to 18 carbon atoms, —$COOY_8$, —$CONY_9Y_{10}$ and/or —$OCOY_{11}$, glycidyl or benzyl, or, if u is 2, $Y_2$ is alkylene having 6 to 12 carbon atoms, butenylene, xylylene or alkylene which has 3 to 20 carbon atoms, is interrupted by one or more —O— atoms and/or is substituted by hydroxyl, $Y_8$ being alkyl having 4 to 12 carbon atoms, alkenylene having 12 to 18 carbon atoms or alkyl which has 6 to 20 carbon atoms, is interrupted by one or more —O— atoms and/or is substituted by hydroxyl, $Y_9$ and $Y_{10}$ independently of one another being alkyl having 4 to 8 carbon atoms and $Y_{11}$ being alkyl having 1 to 8 carbon atoms or alkenyl having 2 or 3 carbon atoms.

More preferably u is 1 and r is 2, $Y_1$ is alkyl having 1 to 4 carbon atoms and $Y_2$ is alkyl having 1 to 18 carbon atoms or alkyl which has 1 to 12 carbon atoms and is substituted by hydroxyl, alkoxy having 1 to 18 carbon atoms, —$COOY_8$ and/or —$OCOY_{11}$, $Y_8$ being alkyl having 1 to 18 carbon atoms, alkenyl having 3 to 18 carbon atoms or alkyl which has 3 to 20 carbon atoms, is interrupted by one or more oxygen atoms and/or is substituted by hydroxyl, and $Y_{11}$ being alkenyl having 2 to 18 carbon atoms.

Particularly prefered are the compounds of formula (III), in which $Y_2$ is alkyl having 1 to 8 carbon atoms or alkyl which has 1 to 4 carbon atoms and is substituted by hydroxyl, alkoxy having 12 to 15 carbon atoms, —$COOY_8$ and/or —$OCOY_{11}$, $Y_8$ being alkyl having 8 to 12 carbon atoms, alkenyl having 12 to 18 carbon atoms or alkyl which has 5 to 10 carbon atoms, is interrupted by an oxygen atom and is substituted by hydroxyl, and $Y_{11}$ being alkenyl having 2 to 8 carbon atoms.

Most preferred are compounds of formula (III), in which $Y_1$ is methyl and $Y_2$ is an octyl radical or alkyl which has 1 to 3 carbon atoms and is substituted by hydroxyl, alkoxy having 13 or 15 carbon atoms, —$COOY_8$ and/or —$OCOY_{11}$, $Y_8$ being a decyl or octadecenyl radical or alkyl which has 7 carbon atoms and is substituted by hydroxyl and interrupted by an oxygen atom, and $Y_{11}$ being propenyl.

A further preferred polyolefin composition is, in which, in the compounds of the formula (I), v and w independently of one another are 1 or 2 and the substituents Z independently of one another are hydrogen, halogen or alkoxy having 1 to 12 carbon atoms.

Also preferred is a composition, in which, in the compounds of the formula (IV), x and y are 1 or 2 and the substituents L independently of one another are hydrogen or alkyl having in each case 1 to 12 carbon atoms.

Individual UV-absorbers suitable in the present invention are given below.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)

phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH₂CH₂—COO—CH₂CH₂]₂ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanlide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Preferably the amount of the individual UV absorber in the mixture is from 20% to 80% based on the weight of the mixture, with the proviso that the sum of the individual components adds to 100%.

Preferably the total amount of the UV-absorber mixture is from 0.005 to 5% based on the weight of the polymer.

Also preferred is a polyolefin composition, which additionally contains at least one sterically hindered amine, in particular an amine of this type containing at least one radical of the formula

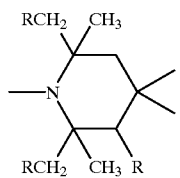

in which R is hydrogen or methyl.

Examples of such sterically hindered amines are bis(2,2,6,6-tetramethyl-4-piperidyl)-sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4,5]-decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The polyolefin composition may contain further additives. Examples are given below.

1 Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxy phenylpropionyl) trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-di-yl)phosphite.

Especially preferred are the following phosphites:

Tris(2,4-di-tert-butylphenyl) phosphite (Irgafos®168, Ciba-Geigy), tris(nonylphenyl) phosphite,

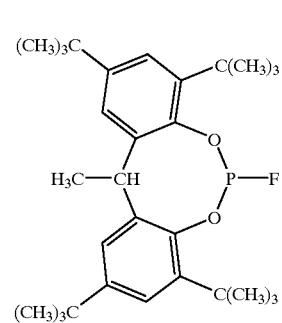

(A)

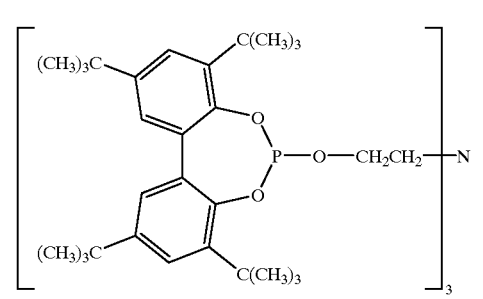

(B)

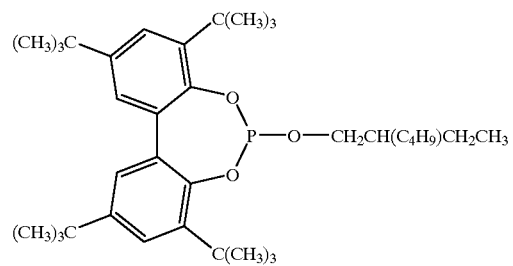

(C)

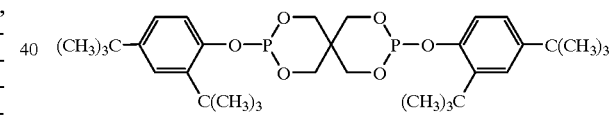

(D)

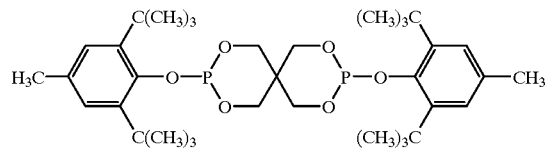

(E)

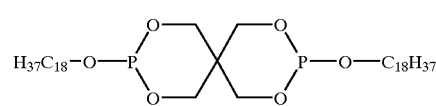

(F)

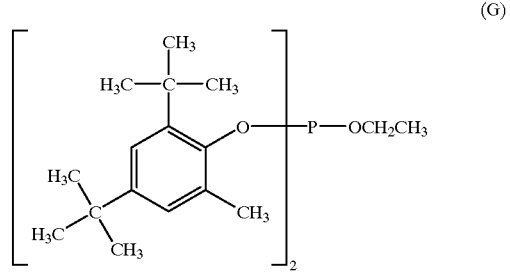

(G)

3. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

4. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

5. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

6. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

7. Other additives, for example, plasticisers, lubricants, emulsifiers, pigments, rheology additives, catalysts, flow-control agents, optical brighteners, flameproofing agents, antistatic agents and blowing agents.

8. Benzofuranones and indolinones, for example those disclosed in U.S. Pat. NoS. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

A further subject of the invention is the use of a mixture of UV-absorbers as defined above for the stabilization of polyolefins.

The following examples illustrate the invention.

EXAMPLE 1

Light Stabilization of PP Homopolymer Films 100 parts of unstabilized polypropylene powder (melt flow index 3.2 g/10 minutes, 230° C./2160 g) are homogenized at 200° C. for 10 minutes in a Brabender plastograph with 0.05 parts of pentaerythrityl-tetrakis-3-(3,5-ditert.butyl-4-hydroxyphenyl)-propionate, 0.05 parts of tris-(2,4-di-tert.butylphenyl )-phosphite, 0.1 parts of Ca stearate and the amount of light stabilizer indicated in table 1. The material thus obtained is compression molded in a laboratory press between two aluminum foils for 6 minutes at 260° C. to a 0.5 mm thick film which is cooled immediately to room temperature in a water-cooled press. Samples of 60×25 mm are cut out of these 0.5 mm films and exposed in a WEATHER-OMETER Ci 65 (black panel temperature 63±2° C., without water-spraying)

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table (Table 1).

TABLE 1

Performance in PP Homopolymer 0.5 mm Thick Films

| Stabilization | T0.1: (h) WEATHER-OMETER Ci 65 | Calculated additive effect of combinations |
|---|---|---|
| Control | 120 | — |
| 0.2% CHIMASSORB 81 | 410 | — |
| 0.2% TINUVIN 326 | 430 | — |
| 0.2% TINUVIN 1577 | 570 | — |
| 0.2% TINUVIN 315 | 905 | — |
| 0.1% CHIMASSORB 81 + 0.1% TINUVIN 1577 | 650 | 490 |
| 0.1% CHIMASSORB 81 + 0.1% TINUVIN 315 | 770 | 657 |
| 0.1% TINUVIN 326 + 0.1% TINUVIN 315 | 705 | 667 |
| 0.1% TINUVIN 1577 + 0.1% TINUVIN 315 | 810 | 737 |

EXAMPLE 2

Light Stabilization of PP Homopolymer Films 100 parts of unstabilized polypropylene powder (melt flow index 12 g/10 minutes, 230°C./2160 g) are homogenized at 200° C. for 10 minutes in a Brabender plastograph with 0.05 parts of pentaerythrityl-tetrakis-3-(3,5-ditert.butyl-4-hydroxyphenyl)-propionate, 0.05 parts of tris-(2,4-di-tert.butylphenyl )-phosphite, 0.1 parts of Ca stearate and the amount of light stabilizer indicated in table 2. The material thus obtained is compression molded in a laboratory press between two aluminum foils for 6 minutes at 260° C. to a 0.1 mm thick film, which is cooled immediately to room temperature in a water-cooled press. Samples of 60×25 mm are cut out of these 0.1 mm films and exposed in a XENOTEST 1200 (black panel temperature 53±2° C., without water-spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table (Table 2).

TABLE 2

Light Stabilization of PP Homopolymer Films

| Stabilization | $T_{0.1}$: (h) XENOTEST 1200 | Calculated additive effect of combinations |
|---|---|---|
| Control | 300 | — |
| 0.6% CHIMASSORB 81 | 3120 | — |
| 0.6% TINUVIN 327 | 440 | — |
| 0.6% TINUVIN 315 | 1090 | — |
| 0.3% CHIMASSORB 81 + 0.3% TINUVIN 315 | 2650 | 2105 |
| 0.3% TINUVIN 327 + 0.3% TINUVIN 315 | 940 | 765 |
| 0.2% CHIMASSORB 81 + 0.2% TINUVIN 327 + 0.2% TINUVIN 315 | 1870 | 1550 |
| 0.4% CHIMASSORB 81 + 0.1% TINUVIN 327 + 0.1% TINUVIN 315 | 2925 | 2335 |
| 0.3% CHIMASSORB 81 + 0.15% TINUVIN 327 + 0.15% TINUVIN 315 | 2720 | 2030 |

EXAMPLE 3

Light Stabilization of PE-HD Films (Phillips-type)

100 parts of a Phillips-type high density polyethylene powder (density: 0.965, melt flow index 6.0 g/10 minutes, 190° C./2160 g) stabilized with 0.05 parts of pentaerythrityl-tetrakis-3-(3,5-ditert.butyl-4-hydroxyphenyl)-propionate and 0.1 parts of Ca stearate are homogenized at 180° C. for 10 minutes in a Brabender plastograph with the amount of light stabilizer and coadditives indicated in table 3. Similarly 100 parts of a Ziegler-type high density polyethylene powder (density: 0.961, melt flow index 6.0 g/10 minutes, 190° C./2160 g) stabilized with 0.05 parts of pentaerythrityl-tetrakis-3-(3,5-ditert.butyl-4-hydroxyphenyl)-propionate, 0.05 parts tris-(2,4-di-tert.butylphenyl)-phosphite and 0.1 parts of Ca stearate are homogenized at 180° C. for 10 minutes in a Brabender plastograph with the amount of light stabilizer and coadditives indicated in table 3a.

The material thus obtained is compression molded in a laboratory press between two aluminum foils for 6 minutes at 210° C. to a 0.2 mm thick film which is cooled immediately to room temperature in a water-cooled press. Samples of 60×25 mm are cut out of these 0.2 mm films and exposed in a XENOTEST 1200 (black panel temperature 53±2° C., without water spraying). Periodically, these samples are removed from the exposure apparatus and their carbonyl content is measured with an infrared spectrophotometer. The exposure time corresponding to formation of a carbonyl absorbance of 0.1 is a measure for the stabilizing efficiency of the light stabilizer. The values obtained are summarized in the following tables 3 and 3a.

TABLE 3

Light Stabilization of 0.2 mm Thick PE-HD Films (Phillips Type)

| Stabilization | $T_{0.1}$: (h) XENOTEST 1200 | Calculated additive effect of combinations |
|---|---|---|
| Control | 360 | — |
| 0.3% CHIMASSORB 81 | 2230 | — |
| 0.3% TINUVIN 327 | 1240 | — |
| 0.3% TINUVIN 315 | 2020 | — |
| 0.15% CHIMASSORB 81 + 0.15% TINUVIN 327 | 3000 | 1735 |
| 0.15% CHIMASSORB 81 + 0.15% TINUVIN 315 | 2650 | 2125 |
| 0.15% TINUVIN 327 + 0.15% TINUVIN 315 | 3060 | 1630 |
| 0.1% CHIMASSORB 81 + 0.1% TINUVIN 327 + 0.1% TINUVIN 315 | 3150 | 1830 |

TABLE 3a

Light stabilization of 0.2 mm Thick PE-HD Films (Ziegler Type)

| Stabilization Comparative Experiment | $T_{0.1}$: (h) XENOTEST 1200 | Calculated additive effect of combinations |
|---|---|---|
| Control | 190 | — |
| 0.3% CHIMASSORB 81 | 1540 | — |
| 0.3% TINUVIN 327 | 700 | — |
| 0.15% CHIMASSORB 81 + 0.15% TINUVIN 327 | 940 | 1120 |

EXAMPLE 4

Light Stabilization of PE-LD Films 100 parts of unstabilized low density polyethylene powder (density: 0.918, melt flow index 0.3 g/10 minutes at 190° C./2160 g) are homogenized at 180° C. for 10 minutes in a Brabender plastograph with 0.02 parts of octadecyl 3-(3,5-di-tert.-butyl-4-hydroxyphenyl)-propionate, 0.08 parts of tris-(2,4-di-tert.butylphenyl)-phosphite and the amount of light stabilizer indicated in the table. The material thus obtained is compression molded in a laboratory press between two aluminum foils for 6 minutes at 170° C. to a 0.5 mm thick film which is quenched immediately in cold water. Samples of 60×25 mm are cut out of these 0.5 mm films and exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table.

TABLE 4

Light Stabilization of PE-LD Films

| Stabilization | $T_{0.1}$: (h) WEATHER-OMETER Ci 65 | Calculated additive effect of combinations |
|---|---|---|
| Control | 150 | — |
| 0.1% CHIMASSORB 81 | 430 | — |
| 0.2% CHIMASSORB 81 | 665 | — |
| 0.1% TINUVIN 326 | 760 | — |
| 0.2% TINUVIN 326 | 1150 | — |

TABLE 4-continued

Light Stabilization of PE-LD Films

| Stabilization | T0.1: (h) WEATHER-OMETER Ci 65 | Calculated additive effect of combinations |
|---|---|---|
| 0.1% TINUVIN 1577 | 815 | — |
| 0.2% TINUVIN 1577 | 1100 | — |
| 0.1% TINUVIN 315 | 705 | — |
| 0.2% TINUVIN 315 | 2000 | — |
| 0.05% CHIMASSORB 81 + 0.05% TINUVIN 1577 | 665 | 622 |
| 0.05% CHIMASSORB 81 + 0.05% TINUVIN 315 | 780 | 567 |
| 0.05% TINUVIN 326 + 0.05% TINUVIN 315 | 795 | 732 |
| 0.05% TINUVIN 1577 + 0.05% TINUVIN 315 | 830 | 760 |
| 0.1% CHIMASSORB 81 + 0.1% TINUVIN 1577 | 920 | 882 |
| 0.1% CHIMASSORB 81 + 0.1% TINUVIN 315 | 1660 | 1332 |

EXAMPLE 5

Light Stabilization of PE-LLD Films 100 parts of unstabilized linear low density polyethylene (PE-LLD) powder (density: 0.920, melt flow index 1.0 g/10 minutes at 190° C./2160 g) are homogenized at 180° C. for 10 minutes in a Brabender plastograph with 0.02 parts octadecyl 3-(3,5-di-tert.-butyl-4-hydroxyphenyl)-propionate, 0.08 parts tris-(2,4-di-tert.butylphenyl)-phosphite, 0.1 parts Ca stearate and the amounts light stabilizers indicated in table 5. Similarly 100 parts of unstabilized metallocene polyethylene powder (density: 0.905, 10% butene comonomer, melt flow index 1.4 g/10 minutes at 190° C./2160 g) are homogenized at 180° C. for 10 minutes in a Brabender plastograph with 0.02 parts octadecyl 3-(3,5-di-tert.-butyl-4-hydroxyphenyl)-propionate, 0.08 parts tris-(2,4-di-tert.butylphenyl)-phosphite, 0.1 parts Ca stearate and the amounts light stabilizers indicated in table 5a (see also example 6). The material thus obtained is compression molded in a laboratory press between two aluminum foils for 6 minutes at 170° C. to a 0.5-mm thick film, which is quenched immediately in cold water. Samples of 60×25 mm are cut out of these 0.5 mm films and exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following tables 5 and 5a.

TABLE 5

Light Stabilization of PE-LLD Conventional Type

| Stabilization | T0.1: (h) WEATHER-OMETER Ci 65 | Calculated additive effect of combinations |
|---|---|---|
| Control | 260 | — |
| 0.2% CHIMASSORB 81 | 2260 | — |
| 0.2% TINUVIN 326 | 1350 | — |
| 0.2% TINUVIN 1577 | 1600 | — |
| 0.2% TINUVIN 315 | 2840 | — |
| 0.1% CHIMASSORB 81 + 0.1% TINUVIN 315 | 3300 | 2550 |
| 0.1% TINUVIN 326 + 0.1% TINUVIN 315 | 2820 | 2095 |
| 0.1% TINUVIN 1577 + 0.1% TINUVIN 315 | 2920 | 2220 |

TABLE 5a

Comparison Between PE-LLD Metallocene Type and Conventional PE-LLD for Combinations Benzophenon/Benzotriazol UV-Absorber (data partly from table 5 and 6)

| Stabilization metallocene PE-LLD | T0.1: (h) WEATHER-OMETER Ci 65 | Calculated additive effect of combinations |
|---|---|---|
| Control | 365 | — |
| 0.2% CHIMASSORB 81 | 1920 | — |
| 0.2% TINUVIN 326 | 1480 | — |
| 0.1% CHIMASSORB 81 + 0.1% TINUVIN 326 | 1880 | 1700 |
| Comparative example with conventional PE-LLD | | |
| Control | 260 | — |
| 0.2% CHIMASSORB 81 | 2260 | — |
| 0.2% TINUVIN 326 | 1350 | — |
| 0.1% CHIMASSORB 81 + 0.1% TINUVIN 326 | 1390 | 1805 |

EXAMPLE 6

Light Stabilization of Metallocene-PE Films 100 parts of unstabilized metallocene polyethylene powder (density: 0.905, 10% butene comonomer) are homogenized at 180° C. for 10 minutes in a Brabender plastograph with 0.02 parts of octadecyl 3-(3,5-di-tert.-butyl-4-hydroxyphenyl)-propionate, 0.08 parts of tris-(2,4-di-tert.butylphenyl)-phosphite, 0.1 part of Ca stearate and the amount of light stabilizer indicated in the table. The material thus obtained is compression molded in a laboratory press between two aluminum foils for 6 minutes at 170° C. to a 0.2 mm thick film which is quenched immediately in cold water. Samples of 60×25 mm are cut out of these 0.2 mm films and exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table.

TABLE 6

Light Stabilization of Metallocene Polyethylene (m-PE-LLD)

| Stabilization | T0.1: (h) WEATHER-OMETER Ci 65 | Calculated additive effect of combinations |
|---|---|---|
| Control | 365 | — |
| 0.2% CHIMASSORB 81 | 1920 | — |
| 0.2% TINUVIN 326 | 1480 | — |
| 0.2% TINUVIN 1577 | 1800 | — |
| 0.2% TINUVIN 315 | 3380 | — |
| 0.1% CHIMASSORB 81 + 0.1% TINUVIN 326 | 1880 | 1700 |
| 0.1% CHIMASSORB 81 + 0.1% TINUVIN 1577 | 2060 | 1860 |
| 0.1% CHIMASSORB 81 + 0.1% TINUVIN 315 | 3440 | 2650 |

EXAMPLE 7

Light Stabilization of PE-HD Films 100 parts unstabilized high density polyethylene powder (density: 0.965, melt flow index 2.9 g/10 minutes, 190° C./5 kg) are homogenized at 180° C. for 10 minutes in a Brabender plastograph with the amount of light stabilizer indicated in the table. The material thus obtained is compression molded in a laboratory press between two aluminum foils for 6 minutes at 210° C. to a 0.2 mm thick film which is cooled immediately to room temperature in a water-cooled press. Samples of 60×25 mm are cut out of these 0.2 mm films and exposed in a WEATHER-OMETER Ci 65 (black panel temperature 63±2° C., without water spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table.

TABLE 7

Light stabilization of 0.2 mm thick PE-HD films

| Stabilization | $T_{0.1}$: (h) Wather-Ometer | Calculated additive effect of combinations |
|---|---|---|
| Control | 280 | — |
| 0.3% CHIMASSORB 81 | 4021 | — |
| 0.3% TINUVIN 327 | 580 | — |
| 0.3% TINUVIN 315 | 2223 | — |
| 0.3% TINUVIN 1577 | 476 | — |
| 0.15% CHIMASSORB 81 + 0.15% TINUVIN 315 | 3616 | 3122 |
| 0.15% CHIMASSORB 81 + 0.15% TINUVIN 1577 | 2560 | 2248 |
| 0.15% TINUVIN 327 + 0.15% TINUVIN 315 | 2496 | 1401 |
| 0.15% TINUVIN 315 + 0.15% TINUVIN 1577 | 3208 | 1349 |
| 0.1% CHIMASSORB 81 + 0.1% TINUVIN 327 + 0.1% TINUVIN 315 | 3136 | 2275 |
| 0.1% CHIMASSORB 81 + 0.1% TINUVIN 1577 + 0.1% TINUVIN 315 | 3314 | 2240 |
| 0.1% TINUVIN 327 + 0.1% TINUVIN 1577 + 0.1% TINUVIN 315 | 1948 | 1093 |

EXAMPLE 8

Light Stabilization of Metallocene-PE-LLD Films 100 parts of unstabilized metallocene polyethylene powder (density: 0.934, melt flow index 6.0 g/10 minutes, 190° C./2160 g) are homogenized at 180° C. for 10 minutes in a Brabender plastograph with the amount of light stabilizer indicated in the table. The material thus obtained is compression molded in a laboratory press between two aluminum foils for 6 minutes at 170° C. to a 0.2 mm thick film which is quenched immediately in cold water. Samples of 60×25 mm are cut out of these 0.2 mm films and exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in the following table.

TABLE 8

Light stabilization of metallocene polyethylene

| Stabilization | T0.1: (h) WEATHER-OMETER Ci 65 | Calculated additive effect of combinations |
|---|---|---|
| Control | 136 | — |
| 0.3% CHIMASSORB 81 | 1803 | — |
| 0.3% TINUVIN 327 | 473 | — |
| 0.3% TINUVIN 1577 | 324 | — |
| 0.3% TINUVIN 315 | 1903 | — |
| 0.15% CHIMASSORB 81 + 0.15% TINUVIN 1577 | 1196 | 1063 |
| 0.15% CHIMASSORB 81 + 0.15% TINUVIN 315 | 2293 | 1853 |
| 0.15% TINUVIN 327 + 0.15% TINUVIN 315 | 1311 | 1188 |
| 0.1% CHIMASSORB 81 + 0.1% TINUVIN 327 + 0.1% TINUVIN 315 | 1637 | 1393 |

All compounds used are commercial UV-absorbers from Ciba Specialty Chemicals Inc. and the trade names are registered trade marks.

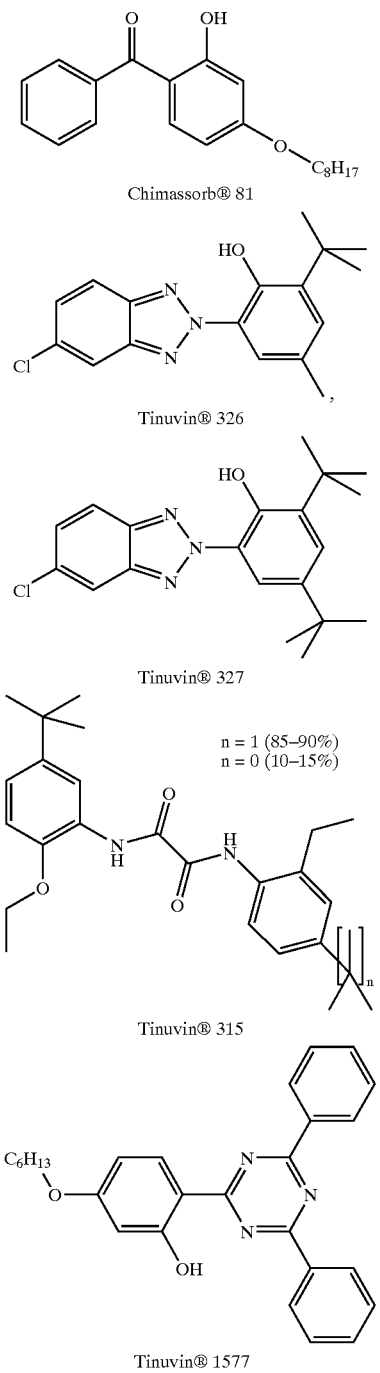

Chimassorb® 81

Tinuvin® 326

Tinuvin® 327 n = 1 (85–90%)
n = 0 (10–15%)

Tinuvin® 315

Tinuvin® 1577

What is claimed is:
1. A polyolefin composition wherein the polyolefin is polyethylene or polypropylene, which comprises as UV absorber a mixture of
a) at least one hydroxybenzophenone and at least one 2-hydroxyphenylbenzotriazole with the proviso that the polyolefin is a high density polyethylene prepared with a Phillips catalyst;
b) at least one hydroxybenzophenone and at least one 2-hydroxyphenyltriazine, with the proviso that if the polyolefin is polypropylene, no polyvinylpyridin is present;
c) at least one hydroxybenzophenone and at least one oxanilide;
e) at least one 2-hydroxyphenyltriazine and at least one oxanilide;
f) at least one hydroxybenzophenone, at least one 2-hydroxyphenylbenzotriazole and at least one oxanilide;
g) at least one hydroxybenzophenone, at least one oxanilide and at least one 2-hydroxyphenyltriazine; or
h) at least one 2-hydroxyphenylbenzotriazole, at least one oxanilide and at least one 2-hydroxy phenyltriazine;
wherein
the hydroxybenzophenone is selected from the group consisting of 2,4-dihydroxybenzophenone, 2-hydroxy-4-methoxybenzophenone, 2-hydroxy-4-octyloxybenzophenone, 2-hydroxy-4-decyloxybenzophenone, 2-hydroxy-4-dodecyloxybenzophenone, 4,2',4'-trihydroxybenzophenone and 2'-hydroxy-4,4'-dimethoxybenzophenone;
the 2-hydroxyphenylbenzotriazole is selected from the group consisting of 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxy-carbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;
[R—$CH_2CH_2$—COO—$CH_2CH_2$ $]_2$ where R=3'-tert-butyl-4'-hydroxy-5'-2H-benzotriazol-2-ylphenyl, 2-[2'-hydroxy-340-(α,α-dimethylbenzyl)-5'-(1,1,3,3-tetramethylbutyl)phenyl]benzotriazole and 2-[2'-hydroxy-3'-(1,1,3,3-tetramethylbutyl)-5'-(α,α-dimethylbenzyl)-phenyl]benzotriazole;
the 2-hydroxyphenyltriazine is selected from the group consisting of 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis2,4-dimethylphenyl)-1,3,5-triazine, 2-(2-hydroxy-4-tridecyloxyphenyl)-4,6-bis(2,4-dimethylphenyl)-1,3,5- triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bi(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hydroxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-propoxy)phenyl]-1,3,5-triazine, 2-(2-hydroxyphenyl)-4-(4-methoxyphenyl)-6-phenyl-1,3,5-triazine, and 2-{2-hydroxy-4-[3-(2-ethylhexyl-1-oxy)-2-hydroxypropyloxy]phenyl)}-4,6-bis(2,4-dimethylphenyl)-1,3,5-triazine;

and the oxanilide is selected from the group consisting of 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2. A polyolefin composition according to claim 1 wherein the amount of the individual UV absorber in the mixture is from 20% to 80% based on the weight of the mixture, with the proviso that the sum adds to 100%.

3. A polyolefin composition according to claim 1 wherein the total amount of UV-absorber is from 0.005 to 5% based on the weight of the polymer.

4. A polyolefin composition according to claim 1, which additionally contains at least one sterically hindered amine containing at least one radical of the formula

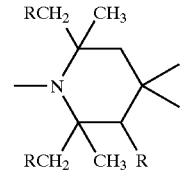

in which R is hydrogen or methyl.

* * * * *